Jan. 13, 1925.
R. WHITESIDE
FRUIT PITTER
Filed Aug. 28, 1923
1,522,660
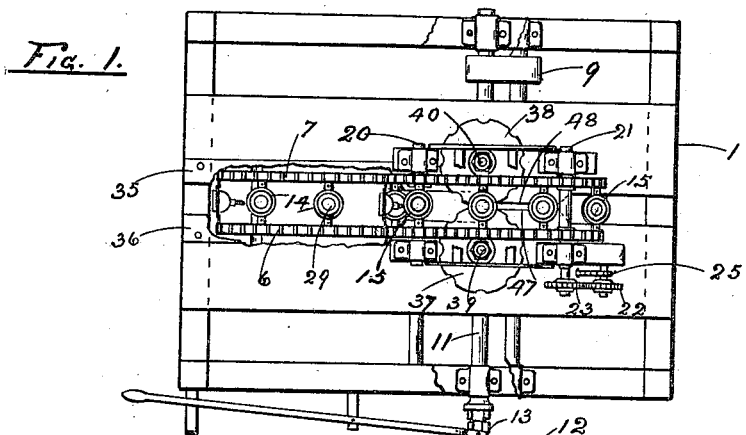
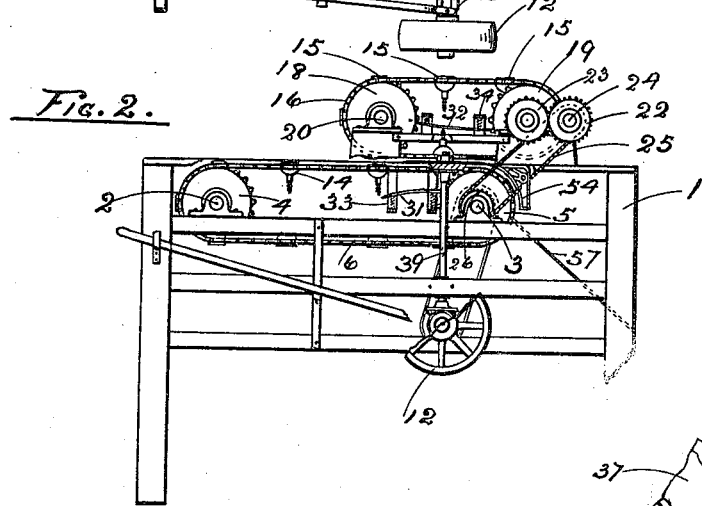
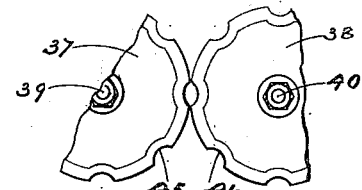
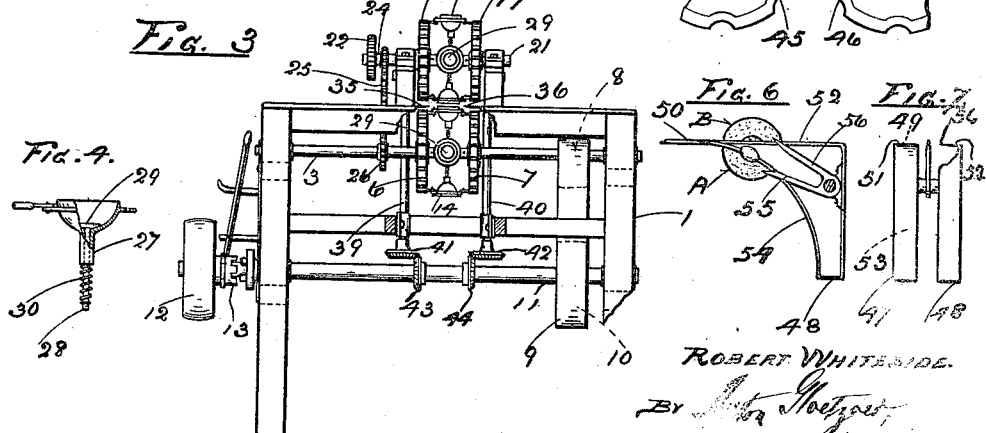
ROBERT WHITESIDE.
By his Atty.

Patented Jan. 13, 1925.

1,522,660

UNITED STATES PATENT OFFICE.

ROBERT WHITESIDE, OF LOS ANGELES, CALIFORNIA.

FRUIT PITTER.

Application filed August 28, 1923. Serial No. 659,702.

*To all whom it may concern:*

Be it known that I, ROBERT WHITESIDE, a citizen of Canada, residing at Los Angeles, county of Los Angeles, and State of California, have invented certain new and useful Fruit Pitters, of which the following is a specification.

My invention relates to a means for preparing fruit for canning and drying, and it has especial reference to a machine for cutting, and removing the stones or pits from, drupaceous fruits, the object of the invention being to provide a simple and efficient apparatus in which extraction or elevation of the stone from the drupe may be accomplished in a continuous manner, without crushing the stone and without lacerating the pulpy exocarp.

Other objects will appear from the subjoined specification, in connection with the accompanying drawing, which is illustrative of a device for executing the above objects and in which—

Fig. 1 is a plan view showing the horizontally disposed knives and the carrier means for the fruit.

Fig. 2 is a side view showing the carrier in substantially the position in which the incision occurs and the stone-removing or elevating means, in the path of the advancing fruit.

Fig. 3 is a front view of the assembled machine with the horizontal knives and the separating means omitted, showing the driving mechanism of the apparatus.

Fig. 4 is an elevation, partly in section, showing one of the cups or carriers and the mounting therefor on the endless chain.

Fig. 5 is a fragmentary plan view of the cutters or rotary knives.

Fig. 6 is a side view showing the means for separating the cut fruit-halves or portions and the pitting knives, and Fig. 7 is a front view showing fruit separating means spaced to permit the stones passing through and the pitting knives in place.

My invention comprises means for receiving and holding the fruit; means for cutting the exocarp of the fruit to, and without breaking or crushing, the stone; means for exerting pressure to hold the fruit in one position during the cutting operation; means for separating the halved or cut fruit, and means for elevating from either of the halves, the stones.

All these operations are accomplished seriatim by the device shown in a preferred form in the drawing.

Upon a frame 1 are journaled a plurality of shafts 2 and 3 each mounting spaced sprockets 4 and 5, over which runs a plurality of spaced chains 6 and 7. On the shaft 3, mounting the sprockets 5, is also a pulley 8, connected by belt 9, with a pulley 10, on a power shaft 11, on which is journaled the main pulley 12, arranged to operate the power shaft 11 by a clutch 13. To the aforementioned chains 6 and 7, are attached a plurality of fruit carriers 14, equally distanced, and supported in the space between the respective chains. These carriers 14 correspond and are arranged to co-operate with similar carriers 15 in conveying the fruit forward and gripping and holding the same during the cutting thereof. The carriers 15 are attached to spaced chains 16 and 17, running over a series of spaced sprockets 18 and 19, mounted on shafts 20 and 21, suitably journaled; the sprockets 18 and 19 being driven in synchronism with the sprockets 4 and 5, in any suitable manner, as by a gear 22, meshing with a gear 23, on the shaft 21. The gear 22 is mounted on a shaft 24, which is driven by a roller chain 25, running over a sprocket wheel 26, keyed or otherwise secured to the shaft 3.

Each of the carriers 14 and 15 is of identical construction and for purposes of this disclosure, may consist of a cup-like or concave receptacle of sufficient dimension and shape, conveniently to accommodate the fruit. The receptacle is formed with a hollow stem 27, through which is extended a plunger 28, the head 29, of which is formed preferably to the contour of the inside of the receptacle and is held in inoperative position by a spring 30. These plungers 28, in each of the co-operating receptacles function to exert a hold upon the fruit during the time of the cutting, hereinafter explained, and to effect the operation of such plungers for this purpose, the following arrangement is made:

Within the path of movement of the plungers 28 of the receptacles 14 and 15, are disposed a plurality of inclined planes 31 and 32, which cause said plungers to move relatively to the receptacles in which they are contained, thereby to effect a pressure upon the fruit. The movement occurs slightly in advance of the cutting operation, and the exertion of pressure upon the fruit continues until the completion of the cutting. In this manner, the fruit is held with the seam line in parallelism with the cutting edges of the knives. These planes 31 and 32, respectively, are yieldingly mounted upon suitable supports 33 and 34, and obviously co-operate with the plungers 28 of the receptacles, in automatically accommodating fruits of varying dimensions.

Suitable guide strips 35 and 36 are provided to hold the chains 6 and 7 against upward movement during the elevation or operation of the plungers 28 in the receptacles.

It will be seen from Fig. 3, that the carriers or receptacles 14 and 15, when co-operating to hold or grip the fruit are always spaced from each other a sufficient distance to permit the cutting of the fruit. Such cutting is effected by a plurality of horizontal rotary knives 37 and 38 mounted upon vertical shafts 39 and 40, suitably supported. On the ends of the shafts 39 and 40 are bevel gears 41 and 42, meshing with similar gears 43 and 44, respectively, on the main driving shaft 11. Each of the knives 37 and 38, respectively, is provided with peripheral cut-out portions or notches 45 and 46, respectively, of a size and shape conforming preferably to the stone or pit of the fruit. The knives 37 and 38 are driven at a speed corresponding with the speed of the chains 6 and 7 and 16 and 17, that is, the relative speeds of these elements are so synchronized that the central axis of the receptacles or carriers always coincide with the central axis of the notches or cut-out portions 46 and 45, which therefore after first cutting through the front portion of the traveling fruit, embrace the stone and then continue to finish the cutting.

The halves of the fruit thus cut are then separated from each other and the stone removed by the following mechanism. After the cutting, the fruit continues to be carried forward by the receptacles which have not yet released the fruit. Contacting with the underside of, and tangential to said knives 37 and 38, are a plurality of separating means or members 47 and 48, formed with extensions 49 and 50, which are arranged to enter the incision in the fruit made by the knives 37 and 38. These separating members 47 and 48 are respectively formed with horizontal planes 51 and 52, and with curviform planes 53 and 54, concentric with the sprockets 5, and function to separate the fruit halves before leaving the receptacles, one half traveling or being conveyed along the horizontal planes 51 and 52 of the separating members, and the other half traveling or being conveyed, while still contained in the receptacle, along the curviform planes 53 and 54, Between the separating members 47 and 48 is disposed a plurality of knives 55 and 56, one substantially above the other. These knives are extended in the plane of the travel of the fruit halves A and B, for a sufficient distance to cause the knives 55 and 56 to cut through a portion of the wall of the fruit halves and to extend under the edge of the stone, whereby the stone is elevated or removed by said knives as the fruit half, carrying the stone, is being conveyed.

The fruit and released stone fall onto a suitable screen 57, which separates the stone from the fruit.

What I claim, is:

1. In a fruit pitter, a plurality of fruit receiving receptacles, means for continuously operating said receptacles, corresponding receptacles co-operating with said first named receptacles to grip and hold the fruit for a determinate distance, means for synchronizing the movement of said corresponding receptacles with that of said receiving receptacles, a plurality of horizontally disposed cutters arranged in the path of the fruit and operable in synchronism with the movement of the fruit to cut the fruit while being held in and conveyed by said receptacles, means to separate the cut fruit, and means disposed in the path of the cut fruit to remove the pit from one or the other half thereof.

2. In a fruit pitter, a plurality of fruit receiving receptacles mounted upon an endless conveyor, a plurality of receptacles co-operating with said fruit receiving receptacles to hold and grip the fruit while in a horizontal plane, a means to cut the fruit about the pit thereof, means to operate said cutting means, a plurality of spaced members disposed in the plane of the incision in the fruit and formed with plane and curviform surfaces to cause the fruit halves to separate, and means projecting in the path of the separated fruit halves to remove the stone from one or the other of said halves.

3. In a fruit pitter, a plurality of fruit receiving receptacles mounted upon an endless conveyor, a plurality of receptacles to hold and grip the fruit while being conveyed in a horizontal plane, a plurality of horizontally disposed knives operable to cut the fruit about the pit thereof, and provided with peripheral notches to embrace the pit during the cutting thereof, means to separate the fruit sections and means to remove the pit from one or the other of said sections.

4. In a fruit pitter, a plurality of fruit conveying receptacles, means movable relatively to said receptacles to exert a pressure upon and hold the fruit, means to operate said holding means, a plurality of cutters, having peripheral notches for cutting the fruit about the stone, means extended in the path of the incision in the fruit and formed with divergent planes to separate the cut fruit and acuminate means in the path of the cut fruit to remove the pit.

In testimony whereof I have set my hand at Los Angeles, county of Los Angeles, and State of California.

ROBERT WHITESIDE.